United States Patent [19]

Kurahashi et al.

[11] 4,383,256
[45] May 10, 1983

[54] DISPLAY DEVICE

[75] Inventors: Koichiro Kurahashi, Amagasaki; Noriyuki Tomimatsu, Nagasaki, both of Japan

[73] Assignee: Mitsubishi Denki Kabushiki Kaisha, Tokyo, Japan

[21] Appl. No.: 154,176

[22] Filed: May 28, 1980

[30] Foreign Application Priority Data

May 29, 1979 [JP] Japan ................... 54-68644

[51] Int. Cl.³ ............................................. G09G 3/22
[52] U.S. Cl. .................................. 340/793; 340/767
[58] Field of Search ............. 340/793, 791, 766, 767

[56] References Cited

U.S. PATENT DOCUMENTS

| | | | |
|---|---|---|---|
| 3,906,290 | 9/1975 | Kurahashi et al. | 340/793 |
| 4,006,298 | 2/1977 | Fowler et al. | 340/793 |
| 4,100,579 | 7/1978 | Ernstoff | 340/793 |
| 4,134,132 | 1/1979 | Magos et al. | 340/793 |

Primary Examiner—Marshall M. Curtis
Attorney, Agent, or Firm—Sughrue, Mion, Zinn, Macpeak and Seas

[57] ABSTRACT

A large scale display device capable of displaying half tones composed of a display panel having a large number of display elements arranged in a matrix form with each element having a memory function. The overall range of an image signal is divided into a plurality of steps or levels. A first level signal is used to control the timing of turning on the display element while a second level signal is used to control the timing of turning off the display element so that the light emitting time period is made proportional to the amplitude of the image signal. Both the number of decisions required and the number of times of controlling the display elements are reduced over prior constructions so that various half tones can be readily displayed.

3 Claims, 5 Drawing Figures

DISPLAY DEVICE

BACKGROUND OF THE INVENTION

The present invention relates to a display device having a display surface constituted by a number of display elements having only on and off states on which an image having half-tones can be displayed.

In a conventional large scale display device such as a scoreboard in a stadium or in a conventional display device using a flat display panel, display elements such as light bulbs or light emitting diodes are arranged in matrix form. In order to display an image having half-tones with a conventional display device of this type, a technique is employed in which the on or display time period of the individual display elements is controlled in accordance with the amplitude of an image signal. The display element is turned off at the end of the display period. With this system, the light emitting time width of the display elements is made proportional to the amplitude of the image signal.

This system of displaying an image having half-tones by controlling the light emitting time width of each display element has various advantages. However, the system is still disadvantageous in the following point. The display period time Tc during which the display element should be turned on for controlling the display element is represented by the following equation:

$$Tc = TF/[(M-1) \times M]$$

where TF is the display period, M is the number of tone levels, and N is the total number of display elements. As is clear from the equation, as the number M of tone levels and the number N of display elements increase, the time Tc decreases. Because of systems requirements, it is difficult or impractical to increase M and N.

SUMMARY OF THE INVENTION

An object of the invention is thus to eliminate the above described difficulties accompanying a conventional system of displaying an image having half tones.

In accordance with the invention, the maximum amplitude of an image signal is represented by two steps or levels having respectively m levels and n levels where m and n are defined by $M = m \times n$ as described above. A first level signal is used to control the timing of turning on a display element while a second level signal is used to control the timing of turning off the display element so that the light emitting time period is made to be proportional to the amplitude of the image signal and both the number of times of on-off decision of the display elements and the number of times of controlling the display elements are reduced as a result of which various half tones of an image can be readily displayed.

In displaying half tones including $m \times n$ tones, it is necessary for the conventional system to carry out the on-off operation $(m \times n - 1)$ times while with the present invention the number of times needed is only $(m \times n - 2)$. In the case where the display period is constant, the time Tc allotted for a single control operation can be increased and therefore the operation of the display device of the invention is made quite stable.

In adjusting the brightness of the overall displayed image, heretofore the display elements were commonly controlled such as by adjusting the supply voltage. However, brightness control according to the conventional technique is subject to irregularities due to fluctuations in the characteristics of the display elements. On the other hand, in the invention, the brightness is controlled by varying only a single on-off time interval so that the brightness adjustment is achieved with the brightness of each display element during its on time maintained unchanged. Accordingly, the brightness adjustment is substantially unaffected by fluctuations in characteristics of the display elements. Thus, the invention is advantageous in that the structure used can be made relatively simple and yet the brightness adjustment provided is quite excellent.

The foregoing object and other objects of the invention have been achieved by the provision of a display device which includes a display panel constituted by display elements arranged in matrix form each element of which has a memory function, level discriminating means for converting an image signal into a first level signal a and a second level signal b defined by $v = a/m \cdot n + b/m$ where v is the maximum amplitude of the image signal of which the overall range thereof is divided into $m \times n$ levels, memory means for storing the first and second level signals, addressing circuit means for providing addresses to read the first and second level signals out of the memory means periodically at a predetermined time interval with the time interval being proportional to coefficiencies $1/m \cdot n$ and $1/m$ of the above equation and for selecting display elements which are to be turned on and off in correspondence with the selection of the addresses, and decision circuit means in which the first and second level signals read every predetermined time interval are compared with levels corresponding to particular time instants thereby to decide whether the corresponding display elements should be turned on or off at the respective time instant with the corresponding display elements turned on according to a decision result provided for one of the first and second level signals and is turned off according to a decision result provided in response to the remaining level signal thereby to display an image having half tones.

DESCRIPTION OF THE PREFERRED EMBODIMENTS

Figure 1:
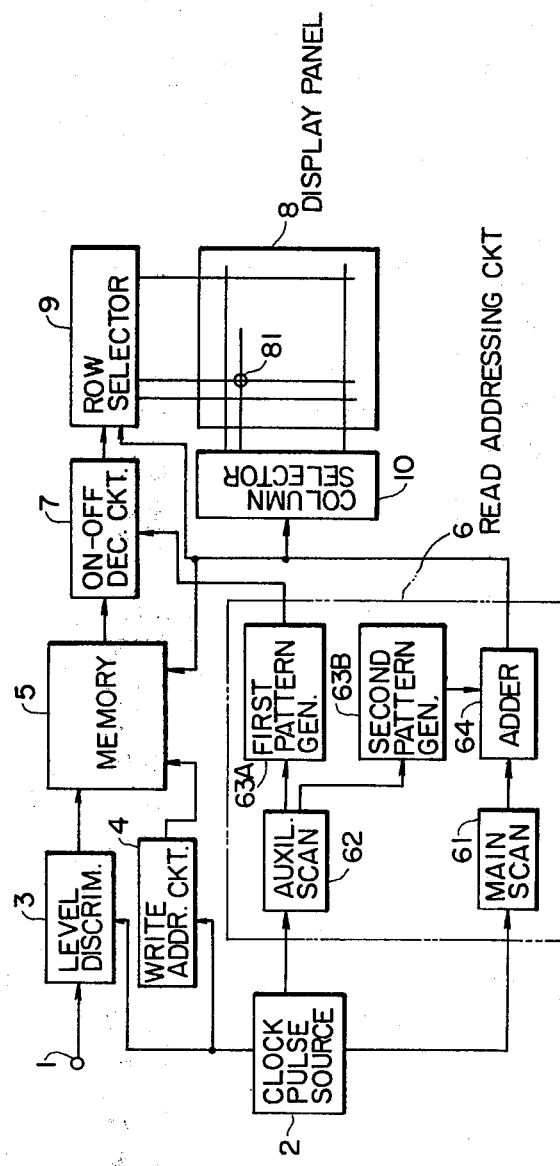
FIG. 1 is a block diagram showing the structure of a preferred embodiment of a display device according to the invention.

A preferred embodiment of the invention will be described with reference to the accompanying drawings. FIG. 1 is a block diagram showing the arrangement of the preferred embodiment of a display device constructed in accordance with the invention and FIGS. 2 through 5 are provided for a description of the operation of the device.

The display device of the invention, as shown in FIG. 1, includes an input terminal 1 to which an image signal to be displayed is applied, a clock pulse source 2, a level discriminating circuit 3, a write addressing circuit 4, a memory 5, and a read addressing circuit 6. The read addressing circuit 6 is constituted by a main scanning circuit 61, an auxiliary scanning circuit 62, first and second pattern generating circuits 63A and 63B, and an adder 64.

The display device further includes an on-off decision circuit 7, a display panel 8 having display elements 81 arranged in a matrix form each having two (on and off) states and a memory function, a row selection circuit 9 adapted to select a row of the display panel, and a column selection circuit 10 adapted to select a column of the display panel.

The operation of the display device thus constructed will be described. An image signal applied to the input terminal 1 is sampled by write clock pulses generated by the clock pulse source 2 and separated into the two level signals a and b by the level discriminator 3. The amplitude range of the image signal is divided into M (=m×n) levels such that:

$$\frac{v}{M} = \frac{a}{mn} + \frac{b}{m}$$

where $a=0, 1, 2, \ldots, n-1$; $b=0, 1, 2, \ldots, m-1$; and where v is the amplitude level of the image signal.

Figure 2:
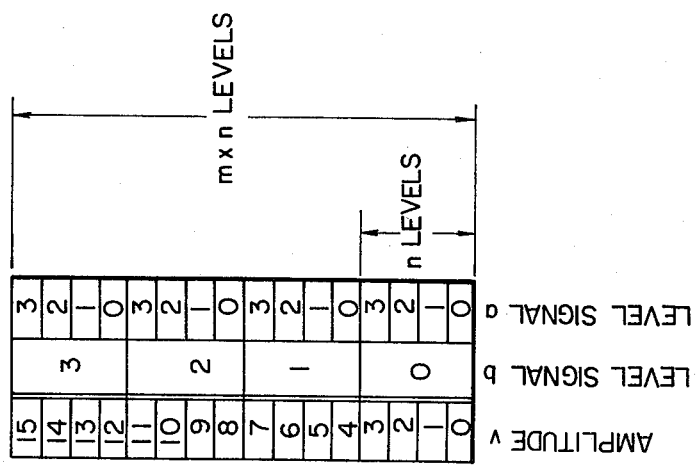
FIG. 2 is a diagram for a description of the conversion of the amplitude of an image signal into level signals in the circuit of FIG. 1.

The image signal is converted into first and second level signals a and b as defined above with the signals being represented by zero or positive integers. From the above equation, the amplitude level is expressed as $v=a+nb$. For instance, for a case of 16 levels (where M=4, and n=4) as indicated in FIG. 2, a signal having an amplitude level of 9 is converted into $a=1$, and $b=2$. The two level signals a and b are successively written into the memory 5 by the write addressing circuit 4 which operates in synchronism with the scanning of the image signal.

Figure 3:
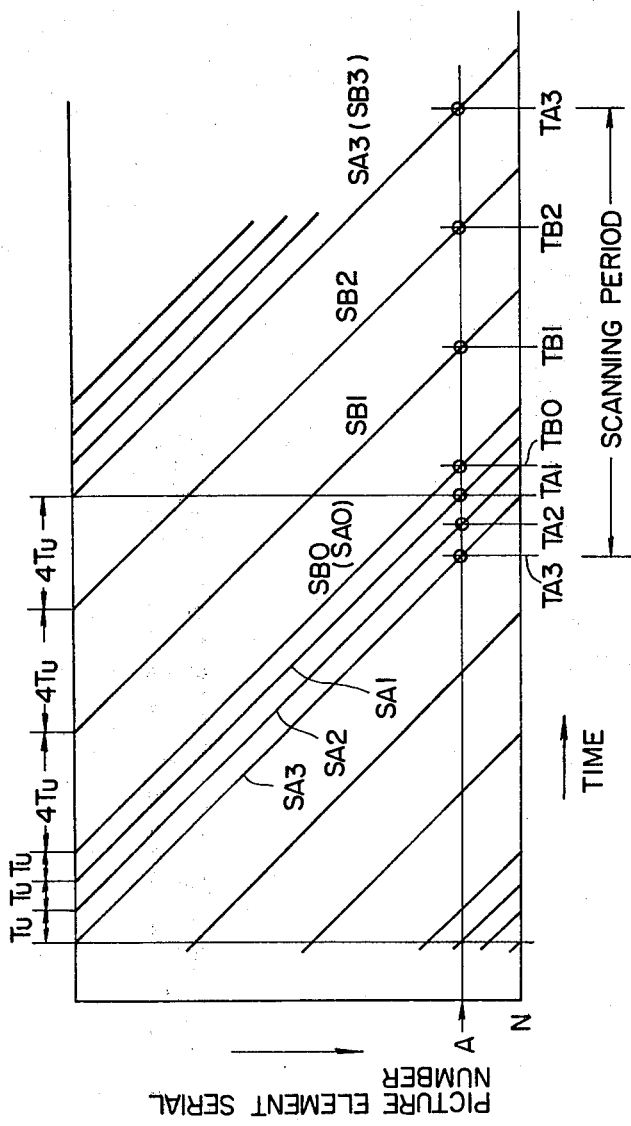
FIG. 3 is a diagram for a description of the scanning operation of the display device of FIG. 1.

The reading and displaying operations of the display device thus constructed for the example above of 16 levels will be described. The read addressing circuit 6 operates to specify at each time instant a display element 81 on the display panel and the picture element address in the memory 5 which corresponds to the display element 81. The read addressing circuit 6 carries out scanning for all picture elements six (=m+n−2) times as indicated by SA3, SA2, SA1 SB0, SB1 and SB2 in FIG. 3 with a display period TF. The picture elements are identified by identifying numbers 1 to N. FIG. 3, in which the horizontal axis indicates time T and the vertical axis indicates the picture element identifying numbers N shows picture elements scanned by the scanning beams SA3, SA2, SA1 SB0, SB1 and SB2. For example, FIG. 3 shows that the picture element identified by number A scanned by the scanning beam SA3 at the time TA3. In response to this, an address in the memory 5 which corresponds to the picture element A is designated. A specific example of the read addressisng circuit 6 will be described later. In this operation, the scanning interval is selected as $Tu=TF/(m=n-1)=TF/15$ and $nTu=4TF/15$ as indicated in FIG. 3.

Picture element identifying number A is designated six times at the times TA3, TA2, TA1, TB0, TB1 and TB2. For the first scanning time TA3, the first level signal a is read out of the memory 5 and is applied to the on-off decision circuit 7 where it is compared with a reference level from the read addressing circuit 6. If the first level signal a is equal to the reference level, for example $a=3$, then the circuit 7 provides an "on" signal. Similarly, at times TA2, TA1 and TB0, level signals a are read out of the memory 5 and comparisons carried out. If $a=2$, $a=1$ and $a=0$ are obtained, "on" signals are correspondingly produced.

The row selection circuit 9 and the column selection circuit 10 operate to designate the picture element identifying number according to a read address signal from the read addressing circuit 6 at each of the time instants TA3, TA2, TA1 and TB0 so that the above described "on" signal provided at each of the time instants is applied to the corresponding display element 81. The display element 81 is maintained in an "on" state until the next "off" signal is applied thereto because of its memory function.

At the time instant TB0, the second level signal is read out of the memory 5 and is applied to the on-off decision circuit 7 where it is compared with a reference level provided for TB0. If $b=0$ is obtained as a result of the comparison, an "off" signal is provided. At the time instant TB0, two decisions $a=0$ and $b=0$ are carried out simultaneously. However, the decision $b=0$ takes precedence over the other.

Figure 4:
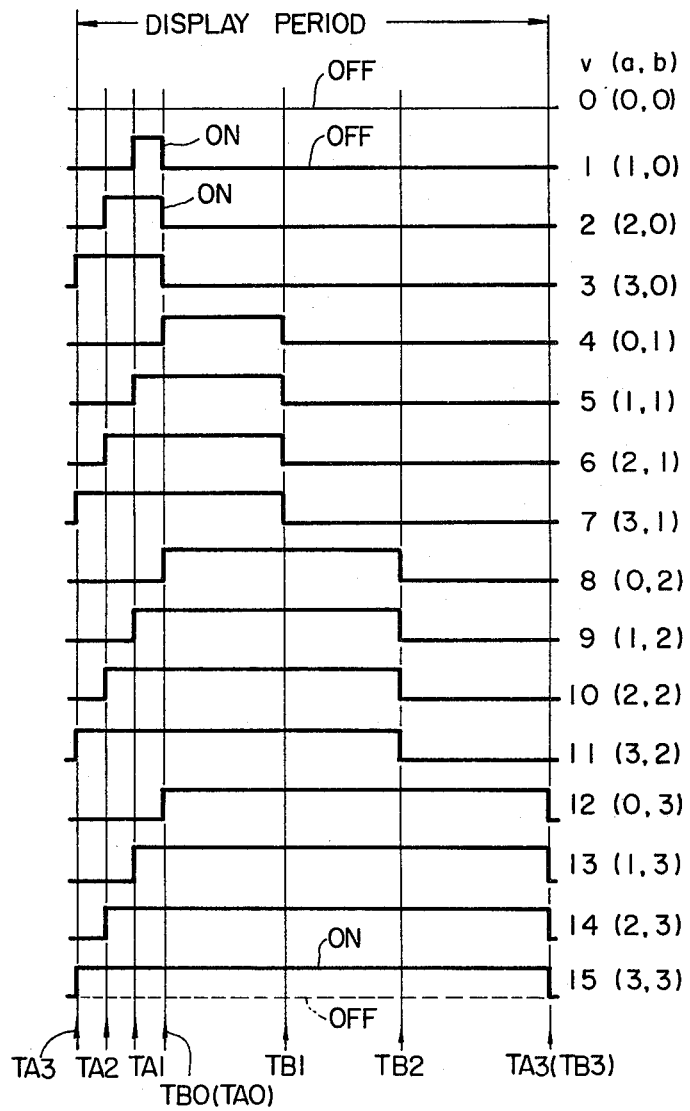
FIG. 4 is a timing chart including the on-off relation of display elements in the display device of FIG. 1.

Similarly, at the time instants TB1, TB2 and TA3, level signals b are read out of the memory 5 and comparisons are carried out in the on-off decision circuit and if $b=1$, $b=2$ and $b=3$ are obtained "off" signals are outputted. As in the case of the "on" signals, the "off" signals are applied to the designated display elements 81 which have been designated by the row selection circuit 9 and the column selection circuit 10 so as to change the "on" state of the elements 81 into the "off" state, respectively. At the time instant TA3, two decisions $a=3$, and $b=3$ are carried out. However, the decision $a=3$ takes precedence over the other. The time period during which a designated display element is maintained in the "on" state, as shown in FIG. 4, follows the amplitude of the image signal. As is clear from FIGS. 3 and 4, on-off decision output signals having m×n types of rectangular waveforms are obtained using only (m+n−2) decisions.

As the brightness of a display element is proportional to the "on" time proportion of the display period, a designated display element can have any of sixteen (16=m×n) tones which are determined by the amplitude of the image signal. As the read addressing circuit 6 scans all of the picture elements, the above described operation is carried out for every display element as a result of which a complete image having half-tones is displayed.

A preferred specific example of the read addressing circuit 6 will not be described. In the example of the display device shown in FIG. 1, the main scanning circuit 61 includes an N-base counter, N being the total number of picture elements, to sequentially scan the picture elements in response to a main reading clock pulse having a period $T0=TF/N$ as determined by the clock pulse source 2. The auxiliary scanning circuit 62 is made up of an (m+n−2) base counter which operates in response to an auxiliary clock pulse with a period $\tau 0=T0/m+n-2)$. The first pattern generating circuit 63A, controlled by the auxiliary scanning circuit 62, generates a reference level signal for the on-off decision circuit 7 at the occurrence of each auxiliary clock pulse $\tau 0$ with the timing $T_M$ of the main read clock pulse as a reference. It is apparent from the above described operation of the on-off decision circuit 7 that, in the case of m=4 and n=4, the reference level signal should be a series of numerical values 3, 2, 1, 0, X and X for the first level signal a and a series of numerical value 3, X, X, 0, 1 and 2 for the second level signal b, where X may be any value.

The second pattern generating circuit 63B is also controlled by the auxiliary scanning circuit 62 to repeatedly generate an address changing signal at the occurrence of every auxiliary clock pulse $\tau 0$ with the timing $T_M$ of the main read clock pulse as a reference. In the case of m=4 and n=4, the address changing signal will be a series of numerical values 0, Nu, 2Nu, 3Nu, 7Nu and 11Nu where Nu is the number of picture elements corresponding to a unit $Tu=TF/m(m.n-1)$ of "on" time duration which is determined from a number of tones for displaying half-tones. That is, $Nu=N/(M.n-1)$.

In the adder 64, the picture element identification number signal from the main scanning circuit 61 is subtracted by the picture element identification number changing signal from the second pattern generating circuit 63B and an addressing signal is thereby produced. Accordingly, the picture element identifying number designating signal, namely the output signal of the circuit 6 becomes A, A-Nu, A-2Nu, A-3Nu, A-7Nu and A-11Nu with the occurrence of each succeeding auxiliary clock pulse $\tau 0$ with the main read clock pulse generating timing $T_M$ used as a reference.

Figure 5:
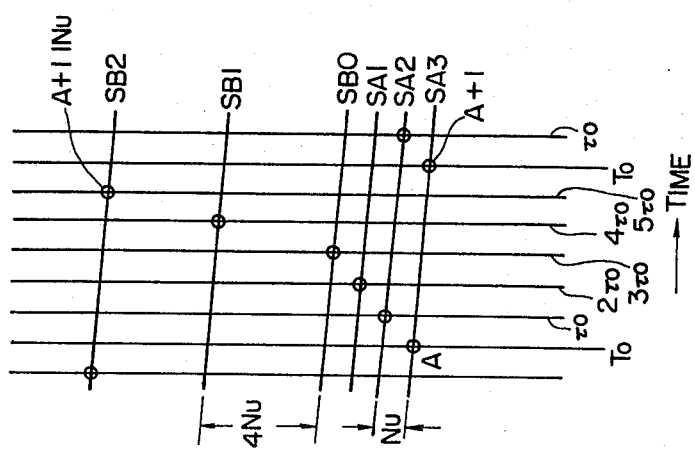
FIG. 5 is a timing chart relating to a scanning operation which is carried out with the timing of every main read clock pulse in correspondence with the scanning operation as described with reference to FIG. 3.

At the time instant $T_M$, the picture element identification number designating signal is advanced as A, A+1, A+2, ... by the main scanning circuit 61. If the scanning of a picture element at a time instant $T_M$ agrees with the first scanning SA3 in FIG. 3, then the picture element is scanned as A, A-Nu, A-2Nu, A-3Nu, A-7Nu and A-11Nu in this order for every auxiliary clock pulse $\tau 0$ as shown in FIG. 5. In this case, the picture element A is designated with a delay of $Tu=Nu\ T0=TF/(m.n-1)$ from TA3 by the scanning at the time instant $T0=\tau 0$ which is simply TA2. The above description applies as well to the other scanning carried out for every clock pulse $\tau 0$. Accordingly, if there is correspondence as T0→SA3, T0+$\tau 0$→SA2, T0+2$\tau 0$→SA1, T0+3$\tau 0$→SB0, T0+4$\tau 0$→SB1, and T0+5$\tau 0$→SB2, the above-described various operations in which the level signal of each picture element is read out of the memory and subjected to an on-off decision and the display elements are designated and turned on and off selectively are carried out while all the picture elements are scanned as a result of which an image having half tones is displayed.

The above description of the invention has been made with reference to the case where the "on" time period for an image signal having a maximum amplitude is equal to the display period. The brightness of the entire display surface can be adjusted by controlling the "on" time period corresponding to the maximum amplitude. That is, the value Nu of the address changing signal produced by the second pattern generating circuit 63B is changed to a value Nu' (<Nu) which is different from $Nu=N/(m\cdot n-1)$. As a result of this change, the scanning (SA2) at the time instant T0+$\tau 0$ for each picture element is delayed by $Tu'=Nu'T0$ from the scanning (SA3) at the time instant T0. This can be applied to SA1, SB0, ...

As is apparent from the above description, Tu'/TF defines the tone unit level or tone seperation for half tones. Therefore, the brightness of the entire display surface can be adjusted by changing Tu', that is, Nu'. In this case also, the level signal can be read out of the memory for every $\tau 0$. This can be made constant irrespective of the value Nu'. However, to carry out brightness control where $Nu'<Nu=N/TF$, TB3 cannot coincide with the following TA3 and therefore it is necessary that the auxiliary scanning 62 be of the (m+n−1) base.

In the above description, for simplification of description, the image signal is converted into the two level signals which are stored in the memory. However, a technique may be employed in which the image signal is converted into a binary-coded signal which is stored in the memory and, when the binary-coded signal is read out of the memory, the on-off decision is carried out with the lower bit group as the first level signal a and with the higher bit group as the second level signal b. Furthermore, a technique may be employed in which the on-off decision is carried out after the level signal read out of the memory has been processed as required. Moreover, it is possible to use the level signal b as the "on" signal and the level signal a as the "off" signal.

The invention has been described with reference to a case where display element selection is carried out for every picture element. However, the display device may be so modified that the display elements are selected on a line-by-line basis in a known manner. In this case, the construction of the display device can be simplified by determining the value Tu or Tu' with the line scanning period as a unit.

What is claimed is:

1. A display device comprising:
 a display panel constituted by display elements arranged in a matrix form, each display element having a memory function;
 level discriminating means for converting an image signal into a first level signal a and a second level signal b defined by the equation $v/M=a/(m\times n)+b/m$ where v is the amplitude level of said image signal and wherein the maximum amplitude level of said image signal is divided into $M=m\times n$ levels;
 memory means for storing said first and second level signals;
 addressing circuit means for selecting addresses of said first and second level signals to be read out of said memory means periodically at predetermined time intervals during a display period with said predetermined time intervals varying and being respectively proportional to either the coefficients 1/(m×n) or 1/m of said equation and for selecting display elements which are potentially to be turned on and off in correspondence to said addresses;
 reference level indicating means for indicating first and second reference signals at said predetermined time intervals; and
 decision circuit means for comparing said first and second level signals and said first and second reference signals read and indicated, respectively, each said predetermined time interval to determine whether the corresponding display element should be turned on or off, said corresponding display elements being turned on according to a decision result produced in response to one of said first level signal and said second level signal and being turned off according to a decision result produced in response to the other of said level signals in order to display an image having half tones, said corresponding display elements being turned on and off no more than once during said display period.

2. The device as claimed in claim 1 wherein one of said image signal and a signal produced by binary-coding said image signal is stored in said memory means.

3. The device as claimed in claim 1 or 2 wherein the time intervals for on and off decisions are changed in proportion to the coefficients of said equation to thereby adjust the brightness of the entire display image.

* * * * *